Nov. 12, 1968   P. A. SANDFORD ETAL   3,410,984
FLEXIBLE ELECTRICALLY HEATED PERSONAL WARMING DEVICE
Filed May 3, 1966

Inventors:
Phillip A. Sandford,
William P. Somers.
by Lawrence R. Kempton
Attorney

United States Patent Office 3,410,984
Patented Nov. 12, 1968

3,410,984
FLEXIBLE ELECTRICALLY HEATED PERSONAL
WARMING DEVICE
Phillip A. Sandford, Bryn Mawr, Pa., and William P.
Somers, Prospect Heights, Ill., assignors to General
Electric Company, a corporation of New York
Filed May 3, 1966, Ser. No. 547,363
8 Claims. (Cl. 219—212)

ABSTRACT OF THE DISCLOSURE

An electrically heated bedcover with a wire-like heater distributed in a pattern within the cover. The heater is formed by a pair of conductors separated by a layer of material having a large positive temperature coefficient of resistance to provide the desired wattage at normal operating temperature. An abnormal temperature over any area is accompanied by reduced heat output over that area.

---

The present invention relates to flexible electrically heated personal warming devices such as electrically heated bedcovers; and, more particularly to such devices which incorporate means to protect against overheat in any portion of the device.

While the following description is directed primarily to electrically heated bedcovers, it is to be understood that the present invention encompasses other electrically heated warming devices such as heating pads.

In the manufacture of electrically heated bedcovers, it is common practice to distribute an insulated electrically conducting heater wire between two fabric layers. In operation, heat from the wire passes through the fabric and is dissipated to the body of the user and to the surrounding atmosphere. It has long been known, however, that in actual use this normal heat dissipation may be inadvertently interfered with such as by bunching the bedcover or by placing a heat insulating object such as a pillow over a portion of the surface of the bedcover. This interference with normal heat dissipation may cause a rise in temperature, which may be referred to as an overtemperature condition, in a localized area to reach such proportions as to cause scorching of the fabric. It is therefore necessary to provide some means to prevent any overtemperature condition from reaching excessive proportions.

In the past, solutions to this overtemperature problem have been provided by positioning a temperature sensing element or elements throughout the bedcover so that the sensing element may open a switch or relay in the heater wire circuit before the overtemperature condition reaches extreme proportions. While the approaches just mentioned solve the immediate problem in that extreme overtemperature conditions are prevented, it remains that in the prior art solutions, when an overtemperature condition exists in a localized region of the bedcover, heat to the entire bedcover is turned off. It is then necessary for the user to correct the cause of the overtemperature condition before heat is again supplied in a normal manner. Needless to say, this may be inconvenient and irritating to the user, particularly if he is sleeping and has to awaken to correct the condition.

It is therefore an object of the present invention to provide a flexible electrically heated personal warming device which has a heater that of itself prevents dangerous overtemperature conditions, should normal heat dissipation be interfered with in a localized area, while still permitting normal heat output from the heater throughout the remaining area of the device.

It is a further object of the present invention to provide a flexible electrically heated warming device that eliminates the need for relays used in overtemperature sensing control systems of the prior art while still assuring safety and providing comfort to the user.

In accordance with the illustrated embodiments of our invention, we provide a flexible electrically heated warming device which includes a pair of closely spaced electrical conductors positioned over the device. A flexible material having a positive temperature coefficient of resistance is in surface contact with each of the conductors and extends between them. In normal operation of the device, substantially uniform heat is generated throughout the device by current flow between the conductors through the positive temperature coefficient material. When, however, an overtemperature condition exists in any localized region of the device, the resistance of the material between the conductors increases in that particular region to limit the heat output in that region; however, normal current flow and heat dissipation may continue in the regions of the bedcover which are not experiencing the overtemperature condition.

The subject matter which I regard as my invention is particularly pointed out and distinctly claimed in the concluding portion of this specification. My invention, however, both as to organization and method of operation, together with further objects and advantages thereof, may best be understood by reference to the following description taken in connection with the accompanying drawing in which:

FIG. 1 schematically illustrates an electrically heated bedcover embodied in this invention and associated control circuitry.

Figure 4:
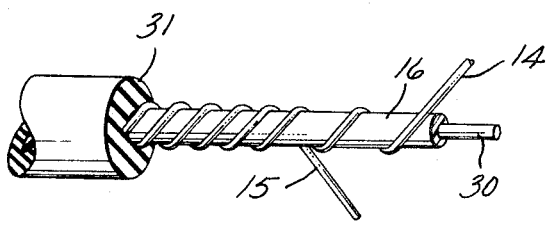
Figure 5:
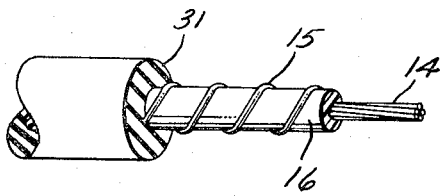
Figure 6:
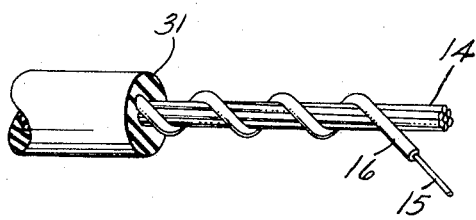

FIGS. 4, 5, and 6 are enlarged partial sections of other structural forms of heater cables embodied in this invention.

Figure 1:
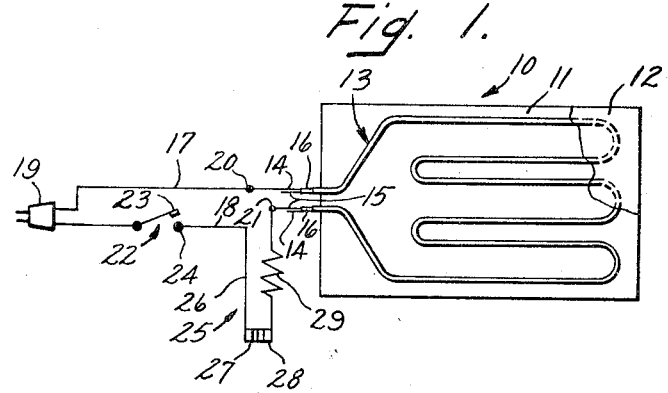

Now referring to FIG. 1 of the drawing, there is illustrated an electrically heated warming device such as an electrically heated bedcover 10 which comprises opposite layers 11 and 12 of a suitable fabric material. A heater wire or cable 13 is distributed over the warming device such as by inserting the cable in a serpentine fashion through channels between the layers. The cable includes a pair of electrical conductors 14 and 15 which are in closely spaced, non-contacting relationship with each other. It is important that the conductors 14 and 15 be closely spaced, generally no more than one-quarter of an inch apart, and the reason for this close spacing requirement will be dealt with hereinafter in greater detail. A mass of flexible solid material 16 having a positive temperature coefficient of resistance is in contact with each of the conductors 14 and 15, and this material extends between the conductors throughout the entire length of the cable.

In order to supply electrical current to the cable, the conductor 14 is connected to one side 17 of a power supply line, and the conductor 15 is connected to the other side 18 of the power supply line. An electrical plug 19 may be inserted into a normal 60 cycle household outlet. The power line 17 is electrically connected as at 20 to conductor 14, and power line 18 is electrically connected as at 21 to conductor 15. These electrical connections may be permanent such as by soldering, or may be accomplished by use of a removable connector plug. A manual line switch 22 having cooperating contacts 23 and 24 permits the user to turn the power on and off. In addition to the line switch 22, we prefer to connect a second switch 25 in one of the power lines. This latter switch is an ambient responsive control including a bimetallic blade 26 having an electrical contact 27 which is adapted to engage electrical contact 28. A resistance heater 29 is in series circuit with the line 18 and in heat transfer relation with the bimetallic blade 26. The ambient responsive control is well known and is described in U.S. Patent 3,114,820—Holmes assigned to General Electric Company, assignee of the present application.

It may be helpful at this point, before going into a discussion of a particular example of an embodiment of the invention, to describe the manner in which the device of FIG. 1 operates. Assuming the plug 19 is inserted in an appropriate power supply receptacle the operation is as follows: When the line switch 22 is closed, electrical current flows through the two conductors 14 and 15, and between the conductors through the positive temperature coefficient of resistance material 16. The initial cold resistance of the material 16 is relatively low and so that heat dissipated by current flow through this material is relatively high. This heat dissipation, however, causes an increase in the resistance of the material. This increase in resistance and consequent decrease in heat dissipation will continue until what may be termed a steady state condition is reached. The material 16 is so selected that at this steady state condition heat is being dissipated at the rated wattage output of the bedcover. In other words, the surface of the bedcover has now achieved a predetermined normal operating temperature. Now, assume that normal heat dissipation is interfered with such as by placing a heat insulating object over a localized region of the surface of the bedcover. An increase in temperature over the predetermined normal operating temperature of the bedcover immediately underneath the insulating object will cause the resistance of the material 16 to increase between the conductors 14 and 15 in this region; and, therefore, the heat being dissipated by the material 16 in this localized region also decreases so that no extreme over-temperature can occur. Current is still flowing in a normal manner, however, in the portions of the cable not affected by the insulating object.

For the material 16 we prefer to use a flexible, solid, dielectric which expands under the influence of heat, for example polyethylene, and electrically conductive particles in the millimicron size range such as carbon black are uniformly dispersed in the dielectric material to provide a plurality of paths for current flow through the dielectric. It is believed that the positive temperature coefficient effect is due to the fact that under heat the dielectric expands. This expansion causes more of he conductive filler particles to be physically separated from each other a greater distance thereby decreasing the number of current flow paths and causing the resistance to current flow to increase.

If, for example, 120 feet of cable 13 is distributed over the bedcover, we have found that a heat output of between 1.0 and 1.25 watts per lineal foot of cable at steady state conditions assures adequate heat and comfort to the user. This wattage output is controlled, to a large extent, by the conductance of the material at steady state conditions when current is flowing between the conductors 14 and 15 through the material 16. The desired heat output may be accomplished, by way of example and with reference to FIG. 2, by helically wrapping a first copper conductor 14 around an insulating core 30, which may be formed of fiberglass. The outer diameter of the wrapped core is on the order of .020 inch. The mass of material 16 having a positive temperature coefficient of resistance is extruded or otherwise applied over the insulating core 30 and the first conductor 14. The material 16 has a generally cylindrical cross-sectional configuration, and thickness of the wall is substantially uniform throughout the length of the material. The outer diameter of this layer of material 16 is on the order of .037 inch. Now, the second copper conductor 15 is helically wrapped around the outer surface of the material 16, and an outer electrically insulating layer 31 of a suitable electrical insulator such as polyvinyl chloride is applied such as by extrusion over the conductor 15 and the outer surface of the material 16. The outer diameter of this insulation 31 is on the order of .080 inch. The material 16 may comprise approximately 73% polyethylene having a resistivity in excess of $10^8$ ohm-centimeters, and 27% of high conductive particulate carbon black by weight. The carbon black particles have an average diameter of approximately 29 millimicrons. Inasmuch as the conductance of the material depends, inter alia, on the percentage of conductive particle loading, the heat output may be increased by increasing the percentage of conductive particles used. With the specific loading of conductive particles just mentioned, a conductance on the order of .0001 mhos between the conductors 14 and 15 and through the material 16 per lineal foot of cable is obtained at normal operating temperatures of the bedcover. It is desirable to add a small quantity of a crosslinking agent to the polyethylene. A suitable crosslinking agent is 40 percent dicumyl peroxide in calcium carbonate. This agent may be added to the polyethylene in amounts on the order of 1.4 parts of the agent for each 100 parts of polyethylene. It is believed that this crosslinking agent toughens the material and helps prevent brittleness and cracking.

As stated above, it is important that the conductors 14 and 15 be closely spaced with respect to each other for effective operation of the device under all conditions. The reason for this is that it is necessary, if an overtemperature condition should occur, that the entire volume of material 16 between the conductors in the region of this overtemperature condition be subjected to the increased heat caused by the overtemperature condition. If the conductors 14 and 15 were separated a great enough distance to permit the overtemperature condition to affect only a portion of the material between the conductors in the region experiencing the overtemperature condition, then this portion, as the resistance increases due to heating, would experience more and more of the voltage drop between the conductors, and this portion would actually become undesirably hotter and hotter. In other words, if the conductors are separated too great a distance apart from each other, the electrical heating circuit could comprise a region wherein the resistance is becoming greater in electrical series with another region or regions where the resistance remains constant at a relatively low value. In this latter case, although the total current flow decreases, the percentage of total heat dissipated between the conductors becomes greater and greater in the region of increasing resistance, and this could lead to an undesirable hot spot in the bedcover in the region where the resistance is increasing.

Figure 2:
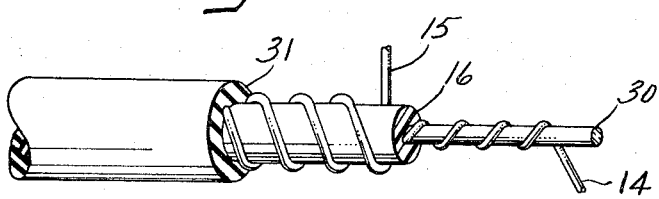
FIG. 2 is an enlarged partial section of a heater cable embodied in this invention.

FIGS. 3, 4, 5 and 6 illustrate other structural forms of heater cables embodied in the present invention, and we have used like numerals to indicate the elements in these embodiments which correspond to the elements of FIGS. 1 and 2.

Figure 3:
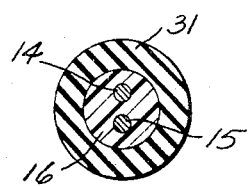
FIG. 3 is an enlarged cross-sectional view of another embodiment of a heater cable of this invention.

In FIG. 3 conductors 14 and 15 extend in closely spaced paralle relation to each other. The conductors may be positioned in the material 16 having a positive temperature coefficient of resistance at the time the material is extruded. The outer insulating layer 31 may be applied later or at the same time as the material 16 is being formed.

With reference to FIG. 4, the material 16 having a positive temperature coefficient of resistance is first extruded or otherwise applied over an insulating core 30, formed of a suitable material such as fiberglass. The conductors 14 and 15 are then helically wrapped around the outer surface of the material in closely and evenly spaced relation to each other.

The embodiment of FIG. 5 discloses a central core of stranded copper forming the conductor 14. The material 16 is applied over this core, and the second conductor 15 is helically wound around the outer surface of the material.

At FIG. 6, the material having a positive temperature coefficient of resistance is extruded or otherwise applied to the surface of one of the conductors 15. This conductor 15 is then helically wound around the second conductor 14 in the form of a stranded copper ore.

While we have shown and described specific embodiments of our invention, we do not desire our invention to be limited to the particular constructions shown and described. Instead, we intend the appended claims to cover all modifications within the true spirit and scope of our invention.

What we claim is:

1. A flexible electrically heated bedcover adapted to be operated at a predetermined normal operating temperature with limited areas subject to abnormally high temperature, said bedcover comprising:
   (a) a flexible wire-like heater distributed throughout the bedcover, and said heater including a pair of flexible electrical conductors, said conductors being oriented in closely spaced, non-contacting relationship with each other;
   (b) said heater further including a layer of flexible, solid material having a positive temperature coefficient of resistance, said layer of material extending between said pair of conductors in surface contact with each of said conductors throughout the length of said conductors and comprising the principal heat generating means;
   (c) said layer of material having an effective normal operating conductance between said conductors such that a predetermined wattage dissipation by electrical current flow through said material between said conductors at normal operating temperature of said bedcover is achieved, and said conductance substantially decreases with respect to the normal operating conductance in any portion of the bedcover experiencing a temperature greater than the normal operating temperature of the bedcover; and
   (d) means for connecting said two conductors to a source of electrical power.

2. A bedcover as set forth in claim 1 wherein a first one of said pair of conductors is wrapped helically around a central insulating core, said layer of material is applied as a coating layer surrounding said central core and said first conductor, and a second one of said pair of conductors is wrapped helically around the outer surface of said layer of material.

3. A bedcover as set forth in claim 1 wherein said layer of material is applied as a coating layer over a central insulating core, and each of said conductors is wrapped helically around the outer surface of said layer of material.

4. A bedcover as set forth in claim 1 wherein said layer is applied as a coating layer completely surrounding one of said conductors.

5. A bedcover as set forth in claim 4 wherein a first one of said conductors comprises a central core within said heater and said layer of material is applied as a coating layer over a second one of said conductors, said second conductor with said layer of material being helically wrapped around said first conductor.

6. A flexible electrically heated bedcover adapted to be operated at a perdetermined normal operating temperature comprising:
   (a) a heater cable including at least two flexible electrical conductors oriented in closely spaced non-contacting position and distributed over the bedcover;
   (b) a layer of flexible, solid, positive temperature coefficient material in surface contact with said two conductors, said material comprising:
      (i) a solid flexible, plastic dielectric having a resistivity in excess of $10^8$ ohm-centimeters, and
      (ii) electrically conductive particles in the millimicron size range dispersed uniformly in said dielectric in sufficient concentration to increase the conductance between said conductors and through said dielectric to a normal operating conductance on the order of .0001 ohm per lineal foot of cable at normal operating temperatures of said bedcover under steady state conditions, and said conductance substantially decreases with respect to the normal operating conductance in any portion of the bedcover experiencing a greater than normal operating temperature; and
   (c) means for connecting said two conductors to a source of power with heat generation from said device predominantly from current flow through said positive temperature coefficient material.

7. The bedcover as set forth in claim 1 wherein said positive temperature coefficient material comprises approximately 73% polyethylene and 27% carbon black particles by weight.

8. The bedcover as set forth in claim 1 wherein said conductors are spaced from each other a distance no greater than 0.25 inch.

References Cited

UNITED STATES PATENTS

| | | | |
|---|---|---|---|
| 2,340,097 | 1/1944 | Woodman | 219—529 |
| 2,392,712 | 1/1946 | Woodman | 219—529 |
| 2,688,070 | 8/1954 | Freedlander | 219—528 |
| 2,846,560 | 8/1958 | Jacoby et al. | 219—549 X |
| 2,861,163 | 11/1958 | Asakawa | 338—224 X |
| 2,978,665 | 4/1961 | Vernet et al. | 338—223 |
| 3,056,750 | 10/1962 | Pass | 252—511 |
| 3,061,501 | 10/1962 | Dittman et al. | 156—250 |
| 3,114,820 | 12/1963 | Holmes | 219—212 X |
| 3,221,145 | 11/1965 | Hager | 219—549 |
| 3,238,355 | 3/1966 | Van Eeck | 219—528 |

BERNARD A. GILHEANY, *Primary Examiner.*

V. Y. MAYEWSLY, *Assistant Examiner.*